United States Patent
Rotta et al.

(10) Patent No.: US 7,299,013 B2
(45) Date of Patent: Nov. 20, 2007

(54) APPARATUS AND METHOD FOR CORRECTING DOPPLER SHIFT IN MOBILE COMMUNICATION SYSTEMS

(75) Inventors: Phillip R Rotta, Kirkland, WA (US); Brian J Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 10/862,170

(22) Filed: Jun. 4, 2004

(65) Prior Publication Data

US 2005/0272379 A1    Dec. 8, 2005

(51) Int. Cl.
*H04B 17/00* (2006.01)
(52) U.S. Cl. .................. 455/67.16; 455/67.11; 455/69; 455/71
(58) Field of Classification Search ............ 455/67.11, 455/67.16, 69, 71
See application file for complete search history.

(56) References Cited

U.S. PATENT DOCUMENTS

| | | | |
|---|---|---|---|
| 4,346,470 | A | 8/1982 | Alvarez, III et al. |
| 6,445,344 | B1 * | 9/2002 | Wise et al. .................. 342/458 |
| 6,707,346 | B2 | 3/2004 | Tillotson et al. |
| 6,865,477 | B2 * | 3/2005 | Nicosia et al. ............ 701/207 |
| 6,965,753 | B1 * | 11/2005 | Miller et al. ................ 455/12.1 |

FOREIGN PATENT DOCUMENTS

| | | | |
|---|---|---|---|
| EP | 1 180 854 | * | 2/2002 |
| JP | 08 023319 | | 1/1996 |

OTHER PUBLICATIONS

Shibuya A. et al., "Performance of TDMA slot synchronization for mobile broadband systems in 40 GHz band radio channel," Sep. 19, 1999, pp. 1038-1042.
PCT, International Search Report, Apr. 6, 2003.

* cited by examiner

*Primary Examiner*—Nay Maung
*Assistant Examiner*—Tuan H. Nguyen
(74) *Attorney, Agent, or Firm*—Harness, Dickey & Pierce, P.L.C.

(57) ABSTRACT

A system and method for correcting for Doppler shift in transmitted and received electromagnetic wave, light wave, or acoustic wave signals between two platforms, where at least one of the platforms is moving relative to the other. The system involves determining a Doppler shift that affects the frequency of a signal being transmitted from a transmitting platform, as a result of motion of the transmitting platform, and adjusting the frequency of the transmitted signal to cancel out the determined degree of Doppler shift that will be experienced by the receiving platform. If the receiving platform is also moving, then a determination is made as to the Doppler shift that will be imparted to the signal being received because of motion of the receiving platform. A receiver on the receiving platform is controlled to account for this degree of Doppler shift. Therefore, the Doppler shift components attributable to the motion of each, or both, platforms is accounted for.

13 Claims, 4 Drawing Sheets

APPARATUS AND METHOD FOR CORRECTING DOPPLER SHIFT IN MOBILE COMMUNICATION SYSTEMS

FIELD OF THE INVENTION

This invention relates to communication systems, and more particularly to a system and method for removing the Doppler shift in the frequency of a signal transmitted from a mobile platform, and/or removing the Doppler shift from a signal received by a mobile receiving platform.

BACKGROUND OF THE INVENTION

In a mobile communication network, Doppler shift occurs when the velocity vector of a transmitting mobile platform differs from the velocity of a receiving mobile platform. For example, when two platforms are stationary with respect to each other (or with respect to a common reference frame) and are communicating with each other, the frequency of the signal received by the receiving platform from the transmitting platform will be the same as the frequency transmitted by the transmitting platform. In this case no Doppler frequency shift exists since the distance between the two platforms remain constant. When the distance between the two platforms is reducing with time, the frequency of the signal received by the receiving platform from the transmitting platform will be higher than the frequency transmitted by the transmitting platform due to the Doppler affect. When the distance between the two platforms is increasing with time, the frequency of the signal received by the receiving platform from the transmitting platform will be lower than the frequency transmitted by the transmitting platform due to the Doppler affect.

It is noted that distance between two platforms can also increase or decrease with time though one of the two platforms is stationary with respect to a common reference frame. This relative distance variation between the two platforms with respect to time will result in a Doppler frequency shift that needs to be accounted for by the receiving platform regardless whether it is the moving platform or the stationary platform with respect to a common reference frame.

For a nominal frequency of $f_0$, the actual frequency at the receiver is $f_0 + \Delta f$, where $\Delta f$ is the Doppler shift. To accommodate this variation in the received frequency of an electromagnetic wave signal, previously developed systems call for the receiver electronics to accept a wider frequency bandwidth than the nominal frequency bandwidth of the signal. This increases the amount of noise entering the receiver, thereby reducing the signal-to-noise ratio. In addition, the variation in frequency means that the system must use larger guard bands, i.e., unused bands of frequency between each link's nominal frequency and the frequencies of other links. This arrangement wastes bandwidth. Furthermore, because the incoming frequency is not precisely known, the receiving modem must scan over a range of frequencies before it can lock onto the carrier. This reduces the time available for data to be received, especially in time division multiple access (TDMA) systems where the modem must resynchronize at the beginning of every time slot. The above described Doppler shift applies to acoustic signals having a frequency of possibly less than 1 Hz to hundreds of KHz, as well as to electromagnetic wave signals. The Doppler shift has the negative effect of increasing the time to establish a two-way communication link due to longer modem synchronization times, the drawback of necessitating the extra bandwidth needed for guard bands, and serves to increase noise present with the received signal as a result of the use of the guard bands.

SUMMARY OF THE INVENTION

The present invention is directed to a system and method for compensating for the Doppler shift effect on a signal being transmitted from a transmitting platform to a receiving platform, where at least one of the two platforms is a mobile platform.

In one preferred implementation the system of the present invention involves the use of a transmitter having an associated processor. The transmitter is located on a mobile platform. A receiver having its own processor is disposed on a separate platform. Signals, for example electromagnetic wave signals, are transmitted from the transmitting mobile platform to the receiving mobile platform. The transmitting mobile platform determines its velocity vector relative to a reference frame that is common to all platforms in the system, as well as a unit vector that represents the direction of the receiving platform relative to the transmitting platform. The processor associated with the transmitter uses the velocity vector and the unit vector to calculate a Doppler shift that would be experienced by the receiving platform if the receiving platform were stationary with respect to a common reference. The processor then alters the transmitted frequency of the signal from the transmitter as necessary to cancel the Doppler shift that the receiving platform would experience.

In another preferred implementation, the receiving platform operates to cancel the Doppler shift on a signal that it is receiving from a transmitting platform. In this embodiment the receiver determines a vector of velocity relative to the common reference frame, as well as a unit vector in the direction from itself to the transmitting platform. A processor associated with the receiver uses this information to determine a Doppler shift that would be experienced by the receiving platform when receiving the signal from the transmitting platform, if the transmitting platform was stationary. The process to adjust the frequency of the receiver is needed to cancel the Doppler shift in the receive signal that is attributable to movement of the receiving platform. In another alternative preferred embodiment, both the receiving and transmitting platforms perform the above-mentioned Doppler shift determinations. The transmitting platform removes the Doppler shift that would be imparted to the transmitted signal as a result of motion of the transmitting platform, while the receiving platform similarly determines and removes the Doppler shift component that is attributable to its own motion, relative to the transmitting platform.

Another alternative preferred embodiment is designed for two-way communications where each platform includes both a receiver and a transmitter that perform the above-mentioned Doppler shift determinations. The transmitter on each platform removes the Doppler shift that would be imparted to the transmitted signal (and experienced by the other mobile platform), as a result of its own motion, while the receiver on each platform similarly determines and removes the Doppler shift component that is attributable to its own motion, relative to the other platform.

The present invention is not limited to electromagnetic wave signals but can be applied to acoustic signals, including sonar signals, as well as optical signals including laser signals. Furthermore, the present invention can be used with electromagnetic wave or light signals transmitted through the atmosphere or between spacecrafts, or to electromagnetic wave or acoustic signals between two underwater vessels communicating with each other while submerged underwater. The present invention is equally applicable to situations where one platform is stationary and the other one is mobile, or where both platforms are mobile.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
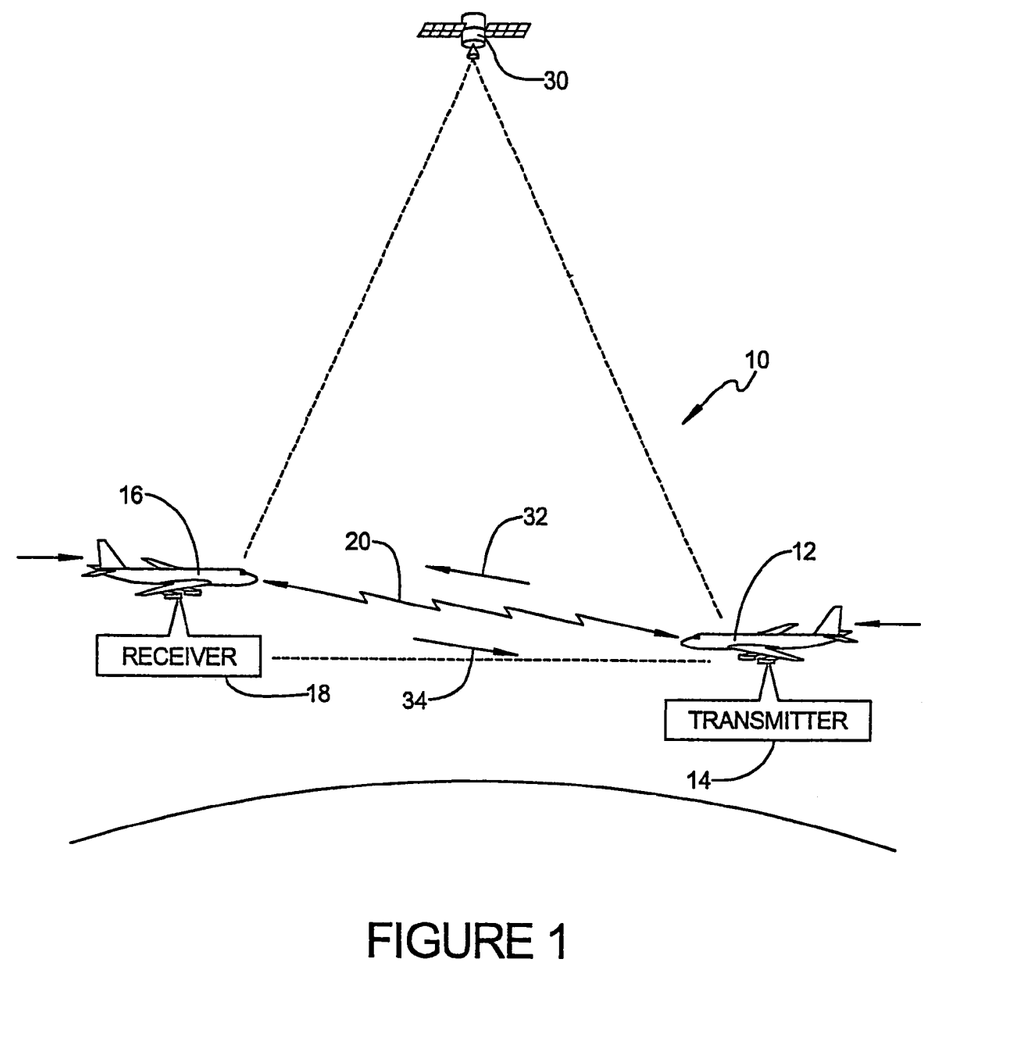
FIG. 1 is a simplified schematic diagram of two mobile platforms communicating with each other and further illustrating, in simplified fashion, the unit vectors that each makes use of in determining a direction from it to the other platform.

Referring to FIG. 1, there is shown a system 10 that includes a preferred implementation of the present invention. The system 10 generally includes a transmitting mobile platform 12 having a transmitter 14 carried thereon, and a receiving mobile platform 16 having receiver 18 located thereon. Assuming for the moment that receiving platform 16 is stationary or moving toward mobile platform 12, then electromagnetic wave signals transmitted from transmitter 14 of transmitting platform 12, as represented by signal line 20, would be increasing slightly in frequency since platform 12 is moving towards platform 16. This increase in frequency represents the Doppler shift that the receiving platform 16 "sees." If receiving platform 16 is moving towards transmitting platform 12, then an additional Doppler shift component will be experienced by receiving platform 16 due to its own movement.

Figure 2:
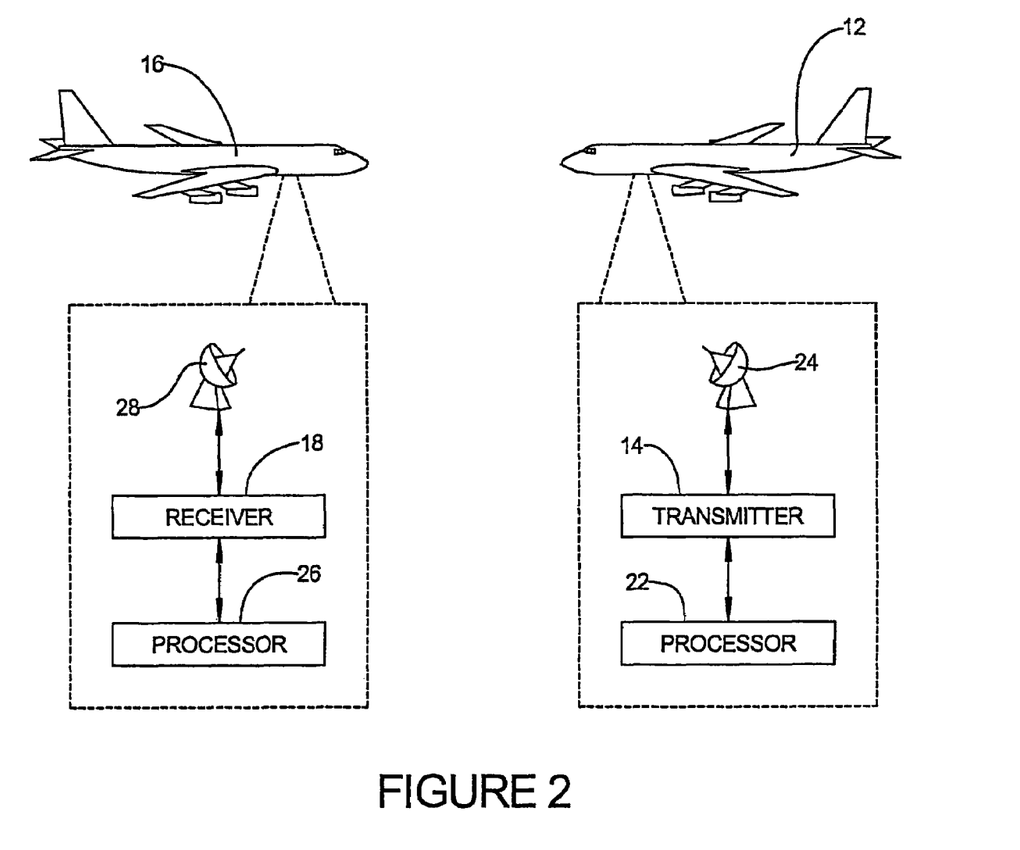
FIG. 2 is a simplified block diagram of the components on the transmitting platform and the receiving platform.

With brief reference to FIG. 2, the transmitter 14 on the transmitting platform 12 is in communication with a processor 22. An antenna 24 is used for transmitting electromagnetic wave signals. The receiving platform 16 similarly includes a processor 26 which is in communication with the receiver 18. An antenna 28 is used for receiving electromagnetic wave signals from the receiver 18. Antennas 28 and 24 may be located on an exterior surface of each mobile platform 12 and 16 or at a suitable location internal to a fuselage of each mobile platform 12 and 16. Furthermore, while the transmitting platform 12 and the receiving platform 16 are each illustrated as aircraft, it will be appreciated that the present invention can be implemented with any mobile platform such as trains, busses, ships, satellites, spacecrafts, missiles, submarines, torpedoes, other airborne vehicles, other undersea vessels, other land vehicles, or other space vehicles. Furthermore, each mobile platform could have a bi-directional transceiver for both transmitting and receiving electromagnetic wave signals. In this instance, as will be explained in greater detail in the following paragraphs, each mobile platform will determine the necessary Doppler shift corrections needing to be applied, on both transmit and receive operations, as a result of its own motion.

Referring further to FIG. 1, the transmitting platform 14, to remove the Doppler effect that will be experienced by the receiving platform 16 due to the motion of the transmitting platform 12, must determine 1) its own velocity relative to a common, pre-established reference frame, and 2) a direction to the receiving platform 16 relative to the common reference frame. If the receiving platform 16 is a mobile platform such as illustrated in FIG. 1, then the receiving platform also must determine its velocity relative to the same (i.e., common, pre-established) reference frame, and also its direction relative to the transmitting platform 12 relative to the same common, pre-established reference frame. The scenario with both platforms 12 and 16 moving towards each other will be assumed for the purpose of the following description.

The total Doppler shift of the electromagnetic wave signal 20 received at the receiver 18 is due to two velocities: the velocity of the transmitting platform 12, as well as the velocity of the receiving platform 16. Assuming for the moment that platform 16 is stationary, the received frequency at receiver 18 can be represented by the following equation:

$$\Delta f_T = f_0 r_{TR} \cdot v_T / c$$

where $f_T$ is the frequency emitted by the transmitter; "c" is the speed of light; "·" represents a vector dot product; where $\Delta f_T$ is the frequency shift due to the transmitting platform's motion; and where $f_0$ represents the carrier frequency of the transmitted signal 20 for the stationary platform.

With the present invention, each mobile platform 12, 16 performs local adjustments to eliminate the part of the frequency shift that is due to its own motion. For example, if the transmitting platform 12 and the receiving platform 16 were each stationary, the transmitting platform 12 would transmit at $f_0$ and the receiving platform 16 would receive the electromagnetic wave signal 20 at $f_0$. However, since the transmitting platform 12 is moving relative to the receiving platform 16, the transmitting platform 12 first determines its velocity vector $v_T$ relative to an agreed upon common reference frame, for example, Local Earth Coordinates or common stellar coordinates. In this regard, it will be appreciated that a common coordinate frame of reference for position and velocity in a three dimensional coordinate system will be necessary in most instances. Three dimensional coordinate systems can be obtained by the aircraft's on-board navigation system which provides longitude, latitude, altitude, direction, and velocity with respect to Local Earth Coordinates. This can be provided by multiple earth stations or multiple GPS satellites (GPS constellation) to correlate a position and determine a velocity. This can be accomplished for a spacecraft by referencing to multiple heavenly bodies (sun, planets, stars, constellations, etc.) to triangulate a position and determine a velocity. There are numerous other common coordinate navigation systems that can be used to determine position and velocity such as Long Range Radio Aid to Navigation (LORAN), VHF Omnidirectional Range navigation system (VOR), etc.

The transmitting platform 12 must then determine a unit vector $r_{TR}$ in the direction from itself to the receiving platform 16 with respect to the common reference frame. The precise mechanism or system for determining the unit vector $r_{TR}$ depends on the system in which the invention is used. For example, and with further reference to FIG. 1, if the satellite 30 is employed with the system 10, then each platform 12 and 16 can continuously report its position to other platforms operating in a given region via the satellite's 30 transponder. This would be assuming that the satellite is a geosynchronous satellite whose location is constant relative to a position on Earth. Other means of establishing a common reference frame could involve having each transmitting platform continuously track the direction of its link partners using synchronous beam cloning, using a signal strength indication in combination with pointing a directional antenna, or other suitable means.

Referring further to FIG. 1, since the transmitting platform 12 knows its approximate position relative to the satellite 30, and since the transmitting platform is able to retrieve approximate position information on the position of the receiving platform 16 via the satellite 30, a unit vector 32 ($r_{TR}$) can be determined. Unit vector 32 represents the direction from the transmitting platform 12 to the receiving platform 16. Similarly, the receiving platform 16 determines a unit vector 34 that represents the direction from it to the transmitting platform 12. The unit vector 34 ($r_{RT}$) is also determined using position information of the position of the transmitting platform 12 that is obtained via the satellite 30. Receiving platform 16 obtains its own position information via any suitable means, such as its inertial navigation system or from satellite 30.

The processor 22 on the transmitting platform 12 determines the Doppler frequency shift ($\Delta f_T$) that a stationary receiver in direction $r_{TR}$ would observe. The processor 22 adjusts the frequency at which transmitter 14 transmits, thus changing its emitted frequency from $f_0$ to ($f_0-\Delta f_T$). This cancels the Doppler shift due to the transmitting platform's 12 motion so the actual Doppler shift experienced by a stationary receiver in direction $r_{TR}$ would be zero.

The receiving platform 16 performs similar steps. The processor 26 initially obtains a velocity of the receiving platform 16 ($v_R$) using the same reference frame as the transmitting platform 12 (i.e., the common reference frame). The receiving platform 16 also determines the unit vector $r_{RT}$ 34 representing the direction from itself to the transmitting platform 12. The processor 26 computes the Doppler frequency shift ($\Delta f_R$) that the receiver would observe for a signal transmitted at frequency $f_0$ from a stationary transmitter along the unit vector 34 (i.e., $r_{RT}$). For electromagnetic wave signals, this frequency shift can be given by the equation:

$$\Delta f_r = f_0 r_{RT} \cdot v_r / c$$

where "$v_r$" is the velocity of the receiving platform.

The processor 26 then adjusts the frequency setting of receiver 18, changing its nominal frequency from $f_0$ to $f_0+\Delta f_R$. Given that the transmitting platform 12 has removed the frequency shift component (i.e., $\Delta f_T$) due to the transmitting platform's 12 motion, the frequency ($f_R$) of the signal arriving at the receiving platform 16 can be given by the equation:

$$f_R = f_0 + \Delta f_r + \Delta f_T - \Delta f_T$$
$$= f_0 + \Delta f_R.$$

The term $f_R$ thus represents exactly the frequency at which the receiving platform's receiver 18 expects to receive the electromagnetic wave signal 20. This substantially eliminates the problems that arise from frequency mismatch due to the Doppler shift of the signal 20.

In practice, the remaining frequency mismatches after the above-described Doppler shift corrections are applied are typically about 1.5-2.0 orders of magnitude smaller than the Doppler mismatch remaining when using many previous developed correction systems. Many remaining frequency mismatches are largely due to measurement errors in speed and direction, and the time lag between these measurements. Additionally, errors in frequency adjustment (i.e. imprecise voltages used to adjust frequency, or imprecise voltage-to-frequency shift coefficients) also can affect the degree of frequency mismatch reduction achieved with the present invention. However, for equipment typically used on aircraft, these errors are typically on the order of one percent to a few percent that of the Doppler shifts encountered without the benefit of the present invention. Thus, the noise entering the receiver, the frequency scan time and the guard bandwidth can all be reduced significantly compared to what is needed with previous correction systems that do not achieve the significant degree of Doppler mismatch reduction that the present invention achieves.

Figure 3A:
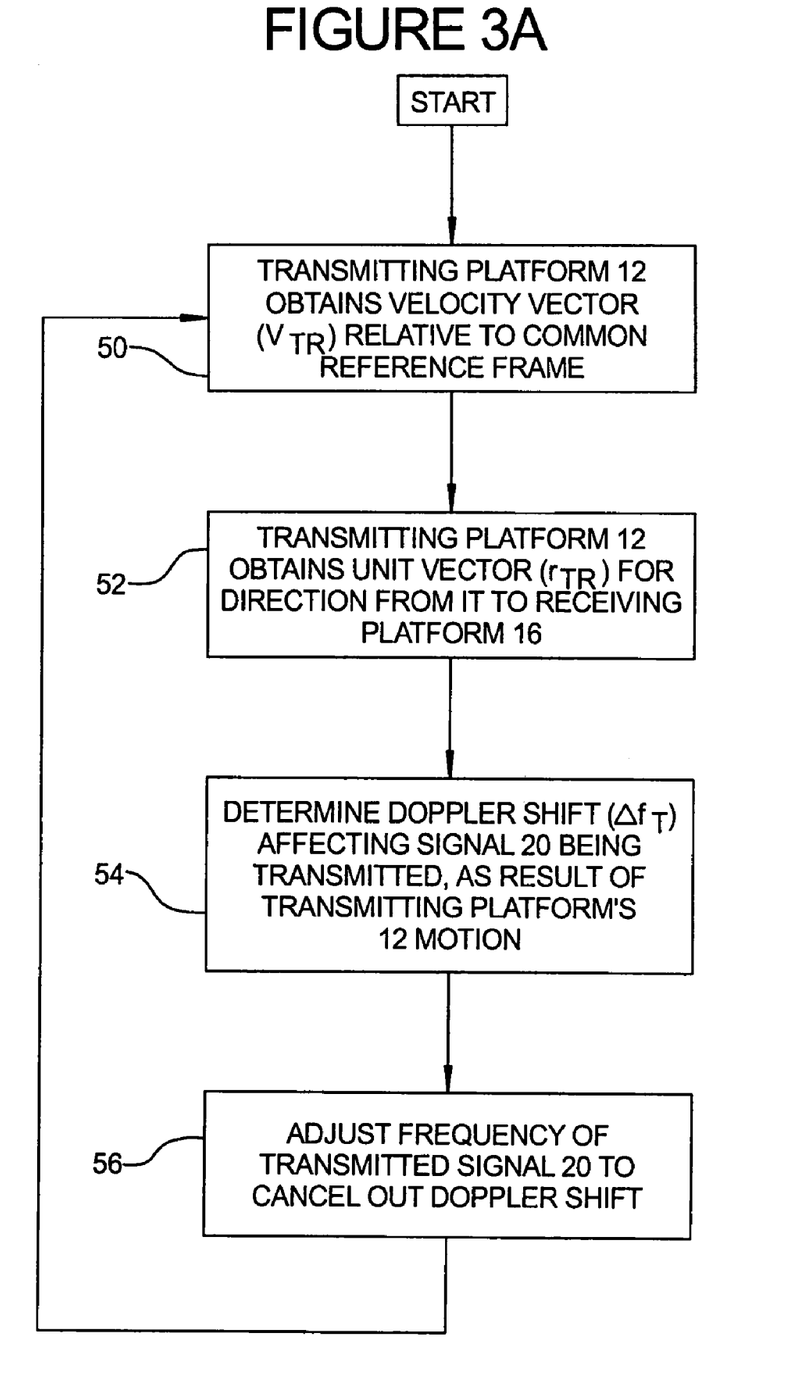
FIG. 3A is a flow chart illustrating the steps performed by a transmitting mobile platform, in accordance with a preferred implementation of the present invention.
Figure 3B:
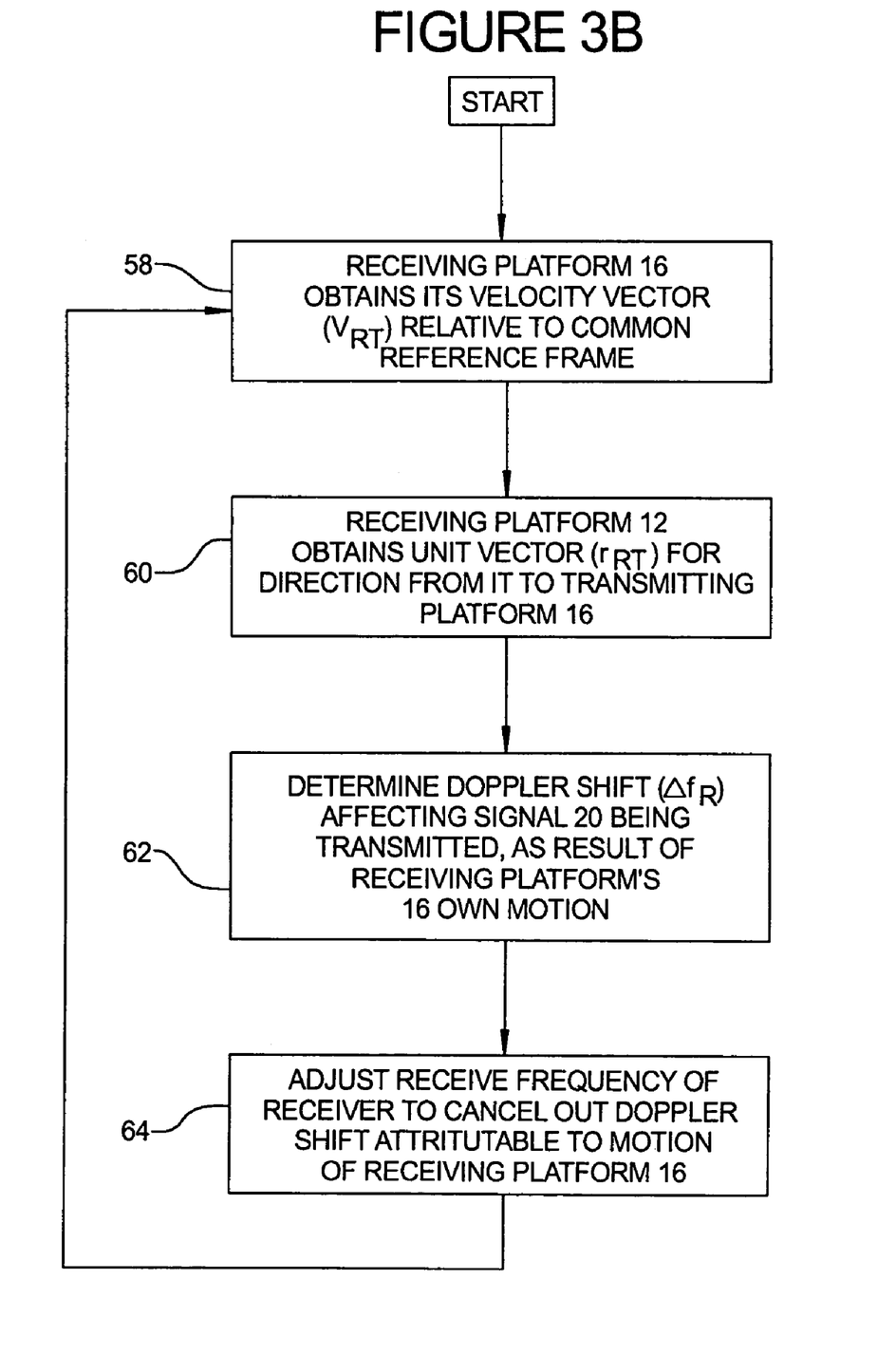
FIG. 3B is a flow chart illustrating the steps performed by a receiving mobile platform, in accordance with a preferred implementation of the present invention.

With brief reference to FIGS. 3A and 3B, a simplified flowchart setting forth the basic steps of one preferred implementation of the present invention 10 will be described. This implementation assumes that both the transmitting platform 12 and the receiving platform 16 are moving relative to the common reference frame. At operation 50, transmitting platform 12 obtains a velocity vector ($v_T$) representing its speed, relative to the common reference frame. At operation 52, the transmitting platform 12 next obtains the unit vector ($r_{TR}$) for the direction from it to the receiving platform 16. At operation 54, the processor 22 determines, from the velocity vector ($v_T$) and the unit vector ($r_{TR}$), the Doppler shift ($\Delta f_T$) affecting the signal 20 being transmitted as a result of the motion of the transmitting platform 12. In operation 56, the processor 22 then controls the transmitter 14 in a manner so that the frequency of the signal 20 transmitted is adjusted as needed to cancel out the Doppler shift ($\Delta f_T$) that will be experienced by the receiving platform 16. These operations are periodically repeated to adjust for changes in $v_T$ and $r_{TR}$. The update rate can be as low as 10 ms for fast aircraft or missiles for which the transmitting platform 12 is relatively close to the receiving platform 16 (i.e., quick dynamic shifts in Doppler). The update rate can be several seconds or longer for submarines with slow maneuvers while receiving ultra low frequency signals (slow dynamic shifts in Doppler). The update rate will depend on how fast the Doppler shift changes. Doppler shift dynamics depend on 1) how fast the relative velocity changes between the receiver and the transmitter and 2) the relative difference in platform velocity with respect to the signal velocity.

At operation 58, the receiving platform 16 obtains velocity vector ($v_r$) information relative to the common reference frame. At operation 60, the receiving platform 60 obtains unit vector ($r_{RT}$) for the direction from it to the transmitting platform 12. At operation 62, the receiving platform 16 determines the Doppler shift ($\Delta f_T$) affecting signal 20 as a result of its own motion, and assuming that transmitting platform 12 is stationary. Finally, at step 64, the processor 26 adjusts the receive frequency of receiver 18 to cancel out the Doppler shift that is attributable to the motion of the receiving platform 16. These operations are periodically repeated to adjust for changes in $v_R$ and $r_{RT}$.

For a two-way communications link between platform 12 and platform 16, there would be a receiver and a transmitter on each platform. The receiver and transmitter on platform 12 will have a common platform velocity vector ($v_{T12}=v_{R12}$) and a common direction vector ($r_{T12R16}=r_{R12T16}$). The resulting transmitter and receiver Doppler frequency adjustments made on platform 12 will be equal and opposite ($\Delta f_{T12}=-\Delta f_{R12}$). Platform 16 would also have a receiver and a transmitter that will have a common platform velocity vector ($v_{T16}=v_{R16}$) and a common direction vector ($r_{T16R12}=r_{R16T12}$). The resulting transmitter and receiver Doppler frequency adjustments made on platform 16 will be equal and opposite ($\Delta f_{T16}=-\Delta f_{R16}$). Thus, each mobile platform would be performing a Doppler shift correction during both transmitting and receiving operations.

The formula for Doppler shift of sound waves varies depending on whether the source is moving, the observer is moving, or both. If the observer (receiver) is moving, the formula for frequency f' that the receiver hears is:

$$f'=(v+v_{observer})/v \qquad \text{Formula 1}$$

where v is the speed of sound in the medium, $v_{observer}$ is the speed of the observer (receiver) toward the source, and f is the frequency in the absence of any Doppler shift. Note that $v_{observer}$ is negative if the observer (receiver) is moving away from the source. If the source (transmitter) is moving, the formula for frequency f' that a stationary receiver hears is:

$$f'=fv/(v-v_{stationary\ receiver}) \qquad \text{Formula 2}$$

where v and f are the same as before and $v_{stationary\ receiver}$ is the speed of the transmitter toward the receiver.

The two formulae combine when both transmitter and receiver are in motion:

$$f'=f(v+v_{observer})/(v-v_{stationary\ receiver}).$$

For the present system and method, the receiver would use the Formula 1 above to correct the incoming frequency and the transmitter would use the Formula 2 to correct the outgoing frequency.

The present invention thus offers a means to reduce the waste of transmitter to receiver frequency synchronization time and bandwidth that is currently caused by Doppler shift in mobile communication systems. This waste is most significant in systems that use fast moving nodes like aircraft, missiles and spacecraft. The Doppler shift has less impact on slow moving systems such as automobiles, vans, trucks or land vehicles, and watercraft. With such slow moving vehicles, the signal velocity is very high compared to the speed of the vehicle as is typically the case when electromagnetic radio frequencies or light frequencies are used. Doppler shift can be significant for relatively slow moving nodes if the signal velocity is comparatively slow, as can be the case when acoustic signals are used.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for correcting for Doppler frequency shift in a signal being transmitted from a mobile transmitting system to a receiving system, comprising:
   determining a velocity vector for each of the receiving system and the transmitting system, relative to a common reference frame that operation of both the transmitting system and the receiving system are referenced to;
   determining a unit vector representing a position of said receiving system relative to said mobile transmitting system; from the velocity vector and the unit vector, determining a Doppler frequency shift parameter that said receiving system, if stationary, would experience when receiving said signal from said mobile transmitting system;
   adjusting a frequency at which said signal is transmitted, using said determined Doppler frequency shift parameter, to cancel said Doppler frequency shift caused by travel of said mobile transmitting platform relative to said receiving system; and
   wherein the signal comprises an electromagnetic wave signal, and wherein determining said Doppler frequency shift parameter comprises using a formula:

$$\Delta f_T = f_0 r_{TR} \cdot V_T / c$$

where:
   $\Delta f_T$=Doppler shift imparted by motion of the transmitting system;
   $f_0$=a nominal carrier frequency of said electromagnetic signal;
   $r_{TR}$=represents the unit vector;
   $V_T$=the velocity vector
   c=the speed of light
   •=a vector dot product.

2. The method of claim 1, further comprising:
   locating said receiving system on a mobile platform;
   determining a velocity vector for said receiving system relative to said system reference frame;
   determining a unit vector representing a position of said transmitting system relative to said receiving system;
   from the velocity vector and the unit vector for the receiving system, determining a receiving Doppler frequency shift parameter that said receiving system would experience when receiving said signal from said mobile transmitting system if said mobile transmitting system is stationary;
   adjusting a frequency setting of a receiver of said receiving system, using said determined receiving Doppler frequency shift parameter, to cancel said Doppler frequency shift caused by travel of said receiving station.

3. The method of claim 2, wherein said signal comprises an electromagnetic wave signal, and wherein determining the receiving Doppler shift frequency parameter comprises using the formula;

$$\Delta f_r = f_0 r_{RT} \cdot V_r / c$$

where: $\Delta f_r$=Doppler shift imparted by motion of receiving the system;
   $f_0$=nominal carrier frequency of the electromagnetic signal;
   $r_{RT}$=unit vector for the receiving system;
   $V_r$=velocity of the receiving system;
   c=speed of light; and
   •=a vector dot product.

4. The method of claim 1, wherein adjusting a frequency setting comprises using a formula $f_0 - \Delta f_T$.

where: $\Delta f_T$=a change in frequency needed to cancel said Doppler shift; and where: $f_0$=nominal carrier frequency of the electromagnetic signal.

5. The method of claim 1, wherein said signal comprises an acoustic wave signal.

6. A method for correcting for Doppler frequency shift in a signal being transmitted from a mobile transmitting system to a mobile receiving system, comprising:

determining a transmitting velocity vector for the transmitting system relative to a common reference frame that both said transmitting system and said receiving system are referencing;

determining a transmitting unit vector representing a position of said receiving system relative to said mobile transmitting system;

from the transmitting velocity vector and the transmitting unit vector, determining a transmitting Doppler frequency shift parameter that said receiving system, if stationary, would experience when receiving said signal from said mobile transmitting system;

adjusting a frequency at which said signal is transmitted, using said determined transmitting Doppler frequency shift parameter, to cancel said Doppler frequency shift caused by travel of said mobile transmitting platform relative to said receiving system;

determining a receiving velocity vector for the receiving system relative to said reference frame;

determining a receiving unit vector representing a position of said receiving system relative to said mobile transmitting system;

from the receiving velocity vector and the receiving unit vector, determining a receiving Doppler frequency shift parameter that said receiving system would experience when receiving said signal from said mobile transmitting system if said mobile transmitting system was stationary;

adjusting a receiving frequency of said receiving system, using said receiving Doppler frequency shift parameter and said receiving unit vector, to cancel said Doppler frequency shift caused by motion of said receiving system relative to said mobile transmitting system; and wherein said signal comprises an electromagnetic wave signal, and wherein a total Doppler shift experienced by the receiving mobile platform is defined by the formula:

$$f_R = f_T + \Delta f_T + \Delta f_R$$

where:

$f_T$=nominal carrier frequency of transmitted electromagnetic signal;

$\Delta f_T$=Doppler shift experienced by the mobile receiving station as a result of motion by the transmitting system; and $\Delta f_R$=Doppler shift imparted by motion of the mobile receiving station.

7. The method of claim 6, wherein said signal comprises an electromagnetic wave signal, and wherein a total Doppler shift experienced by the transmitting mobile platform is defined by the formula:

$$\Delta f_T = f_0 r_{TR} \cdot v_T / c$$

where:

$\Delta f_T$=Doppler shift imparted by motion of transmitting system;

$f_0$=a nominal carrier frequency of said electromagnetic signal;

$r_{TR}$=represents the unit vector;

$V_T$=the velocity vector;

c=the speed of light

•=a vector dot product.

8. The method of claim 6, wherein the signal comprises an electromagnetic wave signal, and wherein adjusting the receiving frequency comprises using the formula:

$$f_R = f_0 \Delta f_R$$

where:

$f_0$=initial carrier frequency of the electromagnetic signal; and $\Delta f_R$=Doppler shift correction determined by the mobile receiving system.

9. The method of claim 6, wherein the signal comprises an acoustic signal.

10. A method for correcting for Doppler frequency shift in an electromagnetic signal transmitted from a transmitting system, and being received by a mobile receiving system, comprising:

determining a velocity vector for each of the transmitting system and the mobile receiving system relative to a common reference frame that both said transmitting system and said mobile receiving system are referenced to;

determining a unit vector representing a position of said mobile receiving system relative to said transmitting system;

from the velocity vector and the unit vector, determining a Doppler frequency shift that said mobile receiving system would experience as a result of movement of said mobile receiving system;

adjusting a frequency of a receiver of said mobile receiving system, based on said determined Doppler frequency shift, to cancel said Doppler frequency shift caused by motion of said mobile receiving system; and wherein determining a Doppler frequency shift comprises using a formula:

$$f_R = f_T + \Delta f_T + \Delta f_R$$

where:

$f_T$=nominal carrier frequency of transmitted electromagnetic signal;

$\Delta f_T$=Doppler shift experienced by the mobile receiving system as a result of motion by the transmitting system; and $\Delta f_R$=Doppler shift imparted by motion of the mobile receiving system.

11. The method of claim 10, further comprising:

locating said transmitting system on a mobile platform;

determining a velocity vector for said transmitting system relative to said common reference frame;

determining a unit vector representing a position of said mobile receiving system relative to said transmitting system;

determining a Doppler frequency shift that would be experienced by said mobile receiving system while receiving said electromagnetic signal as a result of motion of said transmitting system; and modifying a frequency at which said electromagnetic signal is transmitted from said transmitting system to cancel said Doppler frequency shift imparted by motion of said transmitting system.

12. The method of claim 11, wherein determining a Doppler frequency shift caused by motion of said transmitting system comprises using a formula:

$$\Delta f_T = f_0 r_{TR} \cdot V_T / c$$

$\Delta f_T$=Doppler shift imparted by motion of the transmitting system;

$f_0$=a nominal carrier frequency of said electromagnetic signal;

$r_{TR}$=represents the unit vector;

$V_T$ = the velocity vector;
c = the speed of light; and
· = a vector dot product.

13. The method of claim 10, wherein adjusting a frequency of the receiver comprises using the formula:

$$f_R = f_0 + \Delta f_r$$

where:
$f_0$ = initial carrier frequency of the electromagnetic signal; and
$\Delta f_R$ = Doppler shift correction determined by the mobile receiving system.

* * * * *